United States Patent
Yamaguchi et al.

(10) Patent No.: US 6,335,845 B1
(45) Date of Patent: Jan. 1, 2002

(54) MAGNETIC DISK APPARATUS HAVING AN ACCELEROMETER FOR DETECTING ACCELERATION IN THE POSITIONING DIRECTION OF THE MAGNETIC HEAD

(75) Inventors: Takashi Yamaguchi, Tsuchiura; Katsuhiro Tsuneta, Odawara; Katsumoto Onoyama, Hiratsuka; Tsuyoshi Arai, Odawara; Yoshikatsu Fujii, Atsugi; Hidehiko Numasato; Yosuke Hamada, both of Odawara; Masahito Kobayashi, Ushiku, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/117,333

(22) PCT Filed: Jan. 22, 1996

(86) PCT No.: PCT/JP96/00095

§ 371 Date: Jul. 22, 1998

§ 102(e) Date: Jul. 22, 1998

(87) PCT Pub. No.: WO97/27588

PCT Pub. Date: Jul. 31, 1997

(51) Int. Cl.⁷ ................................................. G11B 21/02
(52) U.S. Cl. ..................... 360/75; 360/77.02; 360/78.04
(58) Field of Search ................................. 360/77.02, 75, 360/77.03, 78.04, 60, 69, 77.08, 77.11, 78.12, 78.14

(56) References Cited

U.S. PATENT DOCUMENTS

| | | | |
|---|---|---|---|
| 5,257,255 A | 10/1993 | Miromoto et al. | 369/53 |
| 5,426,545 A | 6/1995 | Sidman et al. | 360/75 |
| 5,521,772 A | * 5/1996 | Lee et al. | 360/75 |
| 5,982,573 A | * 11/1999 | Henze | 360/75 |

FOREIGN PATENT DOCUMENTS

| | | |
|---|---|---|
| EP | 655 736 | 5/1995 |
| JP | 60-136972 | 7/1985 |
| JP | 62-47883 | 3/1987 |
| JP | 63-42073 | 2/1988 |
| JP | 2-226560 | 9/1990 |
| JP | 3-76064 | 4/1991 |
| JP | 3-192585 | 8/1991 |
| JP | 3-272066 | 12/1991 |
| JP | 3-288913 | 12/1991 |
| JP | 4-49530 | 2/1992 |
| JP | 6-215508 | 8/1994 |
| JP | 8-137551 | 5/1996 |

OTHER PUBLICATIONS

Papers of the Society of Instrument and Control Engineers, vol. 31, No. 6, 1995, "Design of Initial Value Compensation for Mode Switching Controller and Its Application to Magnetic Disk Drives", T. Yamaguchi et al, pp. 780–788.

Papers of the Japan Society of Mechanical Engineers, No. 930–9, 2511, 1993, "Adaptive Control of a Digital Servo System for Magnetic Disk Drives", M. Kobayashi et al, pp. 613–615.

* cited by examiner

Primary Examiner—Andrew L. Sniezek
(74) Attorney, Agent, or Firm—Mattingly, Stanger & Malur, P.C.

(57) ABSTRACT

A sector servo type magnetic disk apparatus is provided with, in addition to servo signals, a sensor such as an accelerometer for detecting a state of a magnetic head or a support for the magnetic head at a period shorter than a sampling period of the servo signals. Since an accelerometer mounted on the magnetic head or the support for the magnetic head detects an acceleration, the control performance of a servo control system can be improved, such as reduction of generation of mechanism resonance vibrations of a carriage and improvement on detection precision of a speed signal.

8 Claims, 5 Drawing Sheets

MAGNETIC DISK APPARATUS HAVING AN ACCELEROMETER FOR DETECTING ACCELERATION IN THE POSITIONING DIRECTION OF THE MAGNETIC HEAD

TECHNICAL FIELD

The present invention relates to an information storage apparatus such as a magnetic disk apparatus, and more particularly to a magnetic head positioning control system suitable for improving positioning precision.

BACKGROUND ART

A conventional head positioning control system for a magnetic disk apparatus controls the position of a magnetic head by reading, with the magnetic head, servo signals written in advance on the surface of a magnetic disk. Various methods are known for writing a servo signal on the surface of a magnetic disk. Of these methods, a sector servo system is mainly used because of a recent improvement in the surface record density of a magnetic disk apparatus, which system intermittently writes servo signals over the whole surface of a magnetic disk.

In addition to servo signals written on the surface of a magnetic disk, many proposals have been made to provide sensors and detect more state quantities with the sensors in order to improve controllability. Of these, a first method is to mount an accelerometer on an apparatus housing, a cover, a circuit board or the like and detect, with the accelerometer, vibrations and impacts externally applied to the apparatus in order to intercept the data record operation or detect a repulsion force relative to a seek drive force in order to feed it back to a control system. A second method is to mount a sensor on a control object such as an actuator, a carriage and a magnetic head to detect a state quantity of the control object in order to feed it back. As the latter method, the following methods have been disclosed.

JP-A-60-136972 discloses a feedback control method of feeding back a state detected with an accelerometer mounted on a magnetic head slider. JP-A-63-42073 discloses a method of feeding back a state detected with an accelerometer mounted on a carriage in order to eliminate mechanism resonance of a pivot part of a rotary carriage. JP-A-2-226560 discloses a method of controlling rigidity of an arm part by providing a sensor and actuator for detecting bending vibration of the arm part. JP-A-3-76064 and JP-A-3-192585 disclose a method of improving a loop gain in the sector servo system by mounting an accelerometer near to or on a carriage or a magnetic head, or making a sampling period of a servo loop shorter than a sector servo period by picking up a signal of the accelerometer at a frequency higher than the sampling frequency of the sector servo system and synthesizing it with a servo signal to use a synthesized signal as a feedback position signal.

Increasing a storage capacity of a magnetic disk apparatus and making the apparatus compact requires improvements in record density and data surface efficiency. Improving on the record density requires to narrow a track width. In order narrowing the track width, it is important to maintain a sufficient recording/reproducing characteristic even if a magnetic head width is narrow and to improve a positioning precision. In order to improve a positioning precision, it is necessary to provide a sufficiently wide servo bandwidth of a control system. However, with a present sector servo system, servo signals are written in a partial area of the data area. Therefore, if servo signals are written so that they can be sampled at sufficiently high speed, an efficiency of the data surface is considerably lowered and so a sufficiently wide servo bandwidth cannot be maintained generally.

It is an object of the present invention to provide a high precision control system without degrading the data efficiency of a magnetic disk surface. It is a specific object to provide a servo control algorithm using an accelerometer.

DISCLOSURE OF INVENTION

According to the invention, an accelerometer is mounted on a magnetic head or a carriage to detect an acceleration of a magnetic head along a magnetic head positioning direction and constitute the following control system.

First, the control system has an AD converter for sampling an output signal of the accelerometer at a period shorter than a period of detecting servo signals, and a microprocessor having a compensator for feeding back a signal detected with the accelerometer to improve the dynamic characteristic of a carriage and an actuator.

Second, the microprocessor constitutes: a model control system including a control object model, a first compensator and a feedback loop for controlling the control object model; and a model following control system including a second compensator for comparing a displacement and an acceleration of the control object model with a servo signal and a signal detected with the accelerator, respectively, and making error signals zero and a loop for inputting an addition signal of an input signal to the control object model and an output of the second compensator to the actuator as its drive signal.

Third, the control system has means for calculating a speed signal from the signal detected with the accelerometer and the servo signal.

Fourth, the control system has a seek servo mode for moving the magnetic head to a target track, a following servo mode for positioning the magnetic head at the center of the track, means for setting an initial value to an internal variable of a compensator in the following servo mode when the seek servo mode is switched to the following servo mode, and means for calculating the initial value from the servo signal and the signal detected with the accelerometer when the mode is switched.

Fifth, the control system has a seek servo mode for moving the magnetic head to a target track, a following servo mode for positioning the magnetic head at the center of the track, and means for supplying an impulse train obtained from the servo signal and the signal detected with the accelerometer when the seek servo mode is switched to the following servo mode.

Sixth, the control system has means for calculating an acceleration of the magnetic head from the servo signal and the signal detected with the accelerometer, means for calculating a variation per one turn of a track from the signal detected with the magnetic head accelerometer means for storing the variation, and means for adding the variation to the positioning control loop.

Seventh, the control system has means for measuring the transfer characteristic from the DA converter to the accelerometer and means for controlling a compensator of the positioning control system in accordance with the measured transfer characteristic.

The above-described means may be provided separately or in combinations.

According to the present invention, a signal from the accelerometer mounted on a magnetic head as the control object or on the carriage supporting the magnetic head is detected at an optional sampling period. This sampling period is shorter than the sampling period of the servo signal, and two state quantities including the signal from the accelerometer and the servo signal are input to the microprocessor at different sampling periods. By using these input signals, the microprocessor realizes the above-described means for solving the problems by performing arithmetic operations to be detailed in the following embodiments.

BEST MODE FOR CARRYING OUT THE INVENTION

Figure 2:
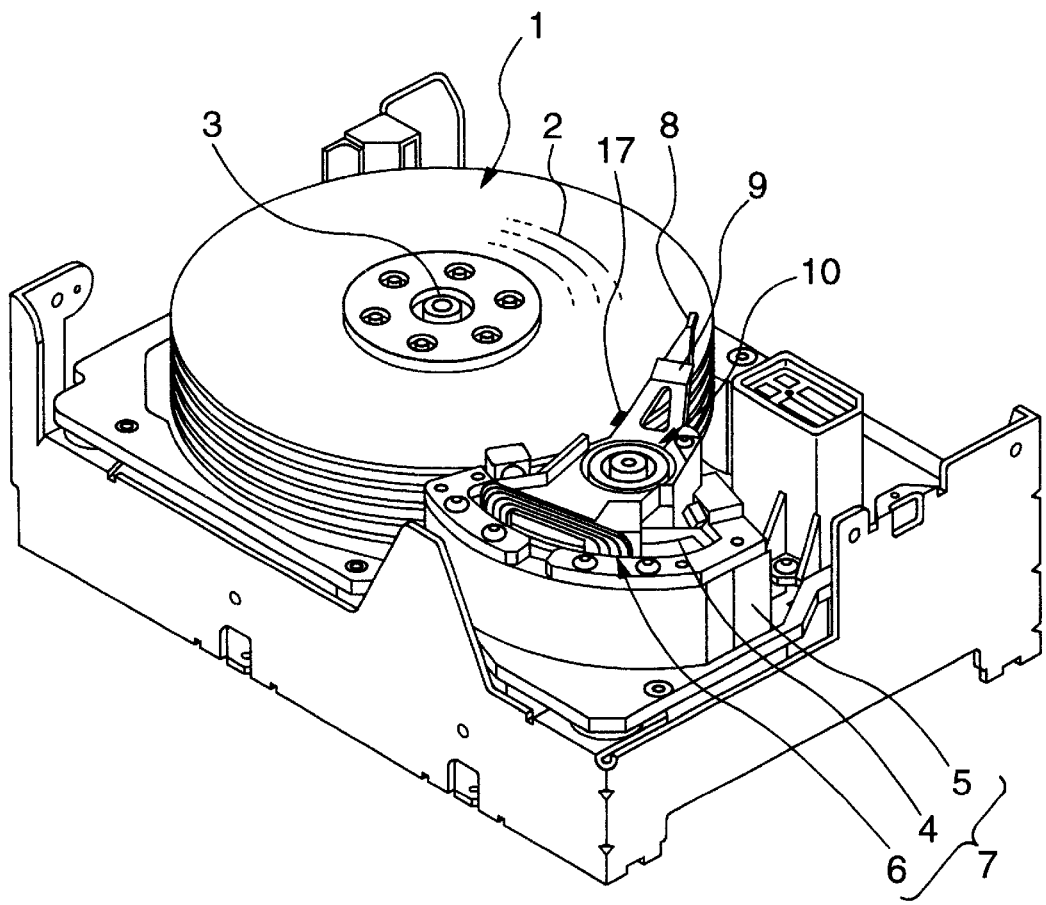
FIG. 2 is a diagram showing the structure of a magnetic disk apparatus.

FIG. 2 shows the structure of a magnetic disk apparatus. A plurality of magnetic disks 1 are stacked around a spindle shaft 3 and rotated by a motor, each magnetic disk 1 being written with several thousand tracks 2. A voice coil motor 7 constituted of a permanent magnet 4 and a yoke 5 mounted on a fixed part and a coil 6 mounted on a movable part is used as an actuator which generates a thrust force when current flows through the coil. A magnetic head and a slider 8, a load arm 9 for imparting a load in a direction vertical to the magnetic disk surface, and a carriage 10 for supporting the magnetic head, slider and load arm, are pivoted about a rotary shaft by the thrust force of the actuator. The magnetic head moves over the magnetic disk surface to a target data track of the magnetic disk surface.

This mechanical structure is assembled in a housing, and an unrepresented circuit board is mounted on the back surface of a base of the housing. Signal transfer to and from the magnetic head and current supply to the actuator are carried out by flexible flat cables connected to the circuit board.

Servo signals as position information are written in advance at constant pitches on each track of the magnetic disk surface. The magnetic head detects the servo signals at timings of a sampling frequency determined from a product of the number of revolutions of the magnetic disk and the number of servo signals per one turn. Each servo signal is constituted of a grey code representative of track number information, a burst signal representative of intra-track position information, and other signals.

Figure 4:
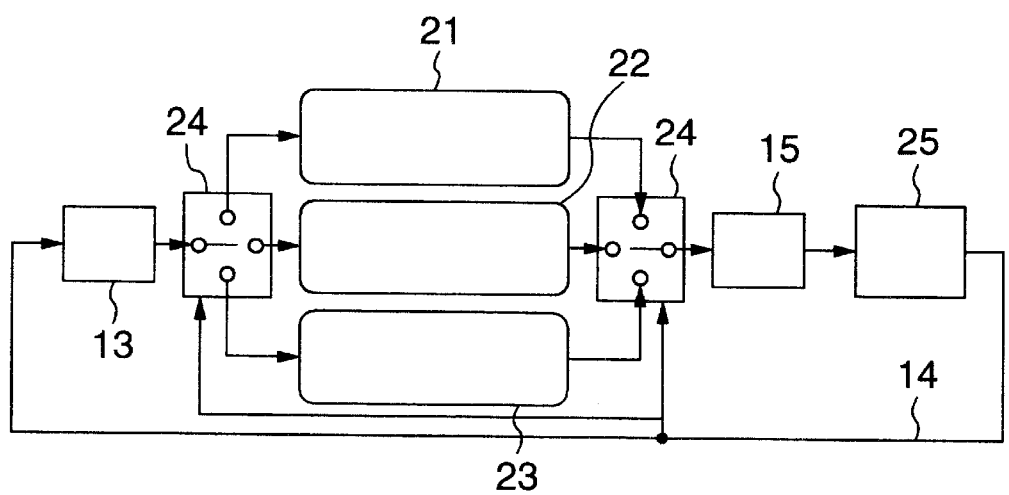
FIG. 4 is a block diagram showing a basic control system.
Figure 5:
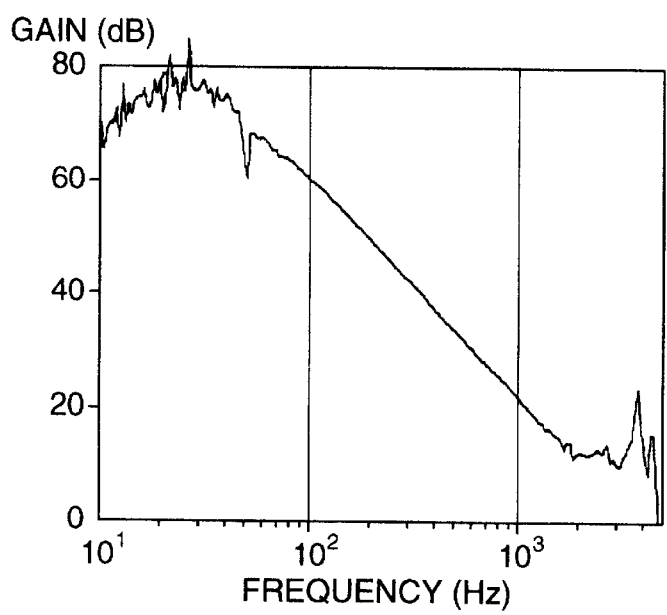
FIG. 5 is a Bode diagram of a frequency characteristic of a control object.

FIG. 4 is a block diagram showing a basic control system. As well known, a magnetic head positioning control system of a magnetic disk apparatus includes: a seek servo mode 21 for moving a magnetic head to a target track at high speed; a centering servo mode 22 for positioning the magnetic head at the center of the target track; and a following servo mode 23 for making the magnetic head follow the target track center to record or reproduce data. These modes are sequentially selected by a switch 24 in accordance with a position deviation between the target track and magnetic head. A control object 25 corresponds to the voice coil motor 7, carriage 10, load arm 9, and magnetic head 8. FIG. 5 is a Bode diagram showing the frequency characteristic of the control object. A main resonance is caused by a rigidity of a pivot shaft part of the carriage 10, and a higher frequency resonance mode is caused by the load arm 9 and a magnetic head 8 part in front of the load arm 9.

Figure 3:
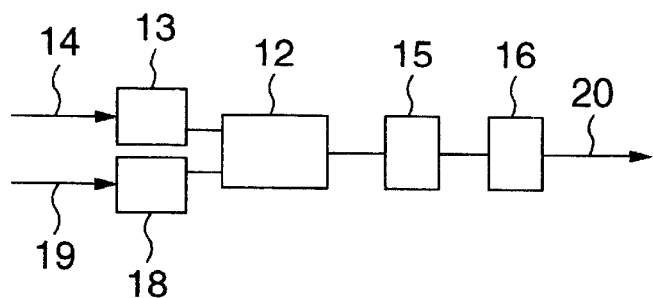
FIG. 3 is a block diagram of a circuit system.

FIG. 3 is a block diagram of a circuit system. A servo signal 14 is input via an AD converter 13 to a microprocessor 12. A sensor 17 for detecting an acceleration of the magnetic head 8 in the positioning direction is mounted on the carriage 10 at a position apart from the pivot shaft toward the magnetic head 8 side. An output signal 19 of the accelerometer 17 is also supplied via a flexible flat cable to the circuit board, and via an AD converter 18 to the microprocessor 12. As above, the input signals to the microprocessor 12 are the servo signal 14 representative of a relative deviation between the magnetic head and magnetic disk and the signal 19 from the accelerometer 17. By using these signals, the microprocessor 12 calculates an operation quantity of the actuator corresponding to a position deviation of the magnetic head from the target track, in accordance with control algorithms for the seek servo mode, centering servo mode, and following servo mode. An output signal from the microprocessor 12 is supplied via a DA converter 15 to a power amplifier 16 which amplifies it and supplies current to the actuator via the flexible cable as an operation quantity 20 of the actuator.

As already described, the sampling period of the servo signals 14 is uniquely determined from the revolution number of the magnetic disk and the number of servo signals 14. For example, if the revolution number is 5400 rpm and 74 servo signals are written per one turn, the sampling frequency is 6.7 Hz and the sampling period is 150 $\mu$s. At this sampling period, the servo signals 14 are input to the microprocessor 12.

The signal from the accelerometer 17 can be supplied at a sampling period of 50 $\mu$s to the micro processor via the AD converter. The input timings of the servo signals 14 are made coincident with those of the signals 19 from the accelerometer 17. Therefore, both the signals are input together once per three times at the sampling period of 50 $\mu$s. The sampling period of output signals from the microprocessor 12 is 50 $\mu$s. As above, the servo control system is a digital control system having the sampling period of 50 $\mu$s.

Figure 1:
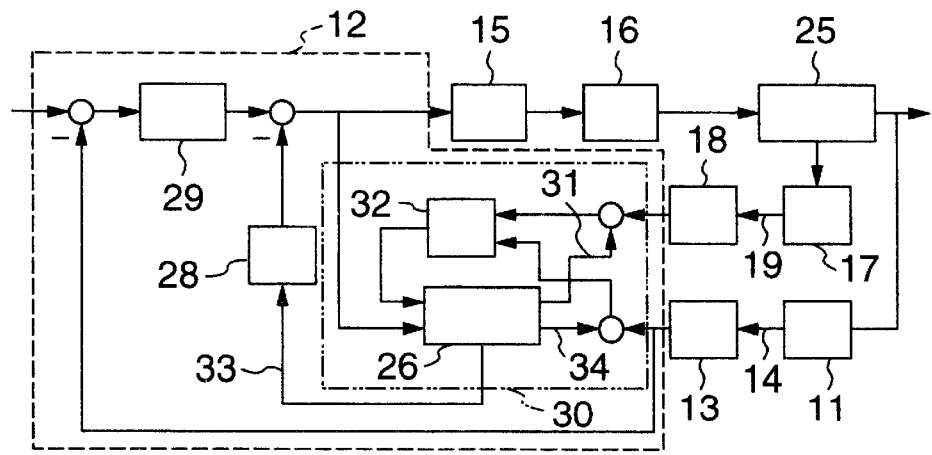
FIG. 1 is a diagram showing the structure of a first embodiment of the invention.

FIG. 1 shows the first embodiment of the invention. FIG. 1 is a block diagram illustrating the following serve mode 23 omitting the switch and other modes. At the sampling period of 50 $\mu$s the signal 19 from the accelerometer 18 is input via the AD converter 18 to the microprocessor 12, and at the sampling period of 150 $\mu$s the servo signal 14 is amplified by an amplifier, converted by a demodulator circuit 11 into an output voltage proportional to a position, and input via the AD converter 18 to the microprocessor 12.

The microprocessor 12 includes a state estimator 30 for estimating a state quantity of a control object, and is configured to have a minor loop and a main loop. In the minor loop, a state quantity 33 estimated by the state estimator 30 is multiplied by a proper feedback transfer function 28 and fed back to compare it with an output of a compensator 29. In the main loop, the servo signal 14 is input to the compensator 29.

The state estimator 30 includes a control object model 26 of a transfer function from the D/A converter 15 to an acceleration state quantity of the carriage 10.

The control object model 26 is expressed, for example, by the following equation (1):

$$\frac{y}{u} = \frac{1}{ms^2} + \frac{\omega^2}{s^2 + 2\zeta\omega s + \omega^2} \qquad (1)$$
$$= \frac{s^2 + 2\zeta\omega s + \omega^2 + m\omega^2 s^2}{ms^2(s^2 + 2\zeta\omega s + \omega^2)}$$

where y is a deviation of a head, u is an operation quantity, m is a mass of the control object, s is a Laplace operator, $\zeta$ is an attenuation factor of a mechanism resonance, and $\omega$ is a specific angular frequency of the mechanism resonance. Specifically, this model has a rigid body mode added with a resonance mode configured with a rigidity of the pivot shaft of the carriage and a mass of the movable part.

The state estimator 30 has two configurations. With one configuration, a signal equivalent to an actual operation quantity is supplied to the state estimator 30, an estimated acceleration 31 is compared with the signal 19 detected by the accelerometer, and an error is multiplied by a proper coefficient 32 and fed back to the control object model 26. With the other configuration, the servo signal 14 and an estimated deviation 34 are compared, an error is multiplied by a proper coefficient 32 and fed back to the control object model 26, similar to the signal 19 from the accelerometer.

Calculation by the state estimator 30 is performed at every 50 $\mu$s, and the estimated state quantity 33 is multiplied by the proper transfer function 28 and fed back.

In this example, the model is a fourth-order model. Since a displacement and an acceleration can be detected as the state quantities of the magnetic head, the state estimator estimates the remaining two state quantities. The feedback loop including the transfer function 28 aims at changing the transfer characteristic from the operation quantity to the acceleration. The transfer function from the operation quantity to the acceleration is given by the following equation (2), by changing the equation (1):

$$\frac{a}{u} = \frac{s^2 + 2\zeta\omega s + \omega^2 + m\omega^2 s^2}{m(s^2 + 2\zeta\omega s + \omega^2)} \qquad (2)$$

The transfer function from a feedback position of the state quantity of the state estimator 30 to the acceleration of the carriage can therefore be changed to a transfer function having a desired performance at the sampling frequency of 10 kHz or lower. For example, the transfer function can be changed so that a peak value of the mechanism resonance of the carriage can be lowered or that a viscosity can be lowered which affects the characteristic of a specific resonance frequency of about several tens kHz.

This will be given by an equation. Assuming that the transfer function from the DA converter 15 to the acceleration state quantity of the carriage is A(s) and that the transfer function being multiplied by the estimated state quantity 33 when it is fed back is F(s), the transfer function from a feedback position of the state quantity of the estimator to the acceleration of the carriage to be obtained through the provision of the feedback loops is given by the following equation:

$$\frac{A(s)}{1 + A(s)F(s)} \qquad (3)$$

Since F(s) is contained in the characteristic equation of this transfer function, the transfer characteristic A(s) of the actual mechanical system can be changed with F(s) and the desired characteristic can be obtained.

In this embodiment, since the servo signal 14 is input to the state estimator 30 at the sampling period of 150 $\mu$s, the detected servo signal 14 is compared with the estimated deviation 34 once per three times at the sampling period of 50 $\mu$s of the calculation by the state estimator 30. At the remaining sampling times, a loop for feeding back an error is not calculated. It can be easily thought of as a method of estimating a state quantity by using only the signal 19 from the accelerometer, without providing the feedback loop in which the servo signal 14 is compared with the estimated deviation 34 and an error is fed back to the control object model 26 similar to the signal 19 from the accelerometer.

The following servo mode as an ordinary main loop is calculated at the sampling period of 150 $\mu$s. Therefore, the compensator 29 in the following servo mode is calculated at the sampling period of 150 $\mu$s, whereas the state estimator 30 and feedback transfer function 28 are calculated at the sampling period of 50 $\mu$s. Input to the DA converter 15 is therefore an addition signal of the output signal from the feedback transfer function 28 updated at the sampling period of 50 $\mu$s and the output signal from the compensator 29 updated at the sampling period of 150 $\mu$s in the following servo mode.

The calculation operations for the state estimator 30 and feedback transfer function 28 may be performed always in the other modes such as a seek servo mode, as well as in the mode of this embodiment.

In this embodiment, a so-called minor loop is provided and is calculated at a period shorter than that of the main loop. It is therefore possible to effectively change the minor loop transfer characteristic, including the higher frequency components than the sampling frequency of the sector servo, to a desired characteristic.

Figure 6:
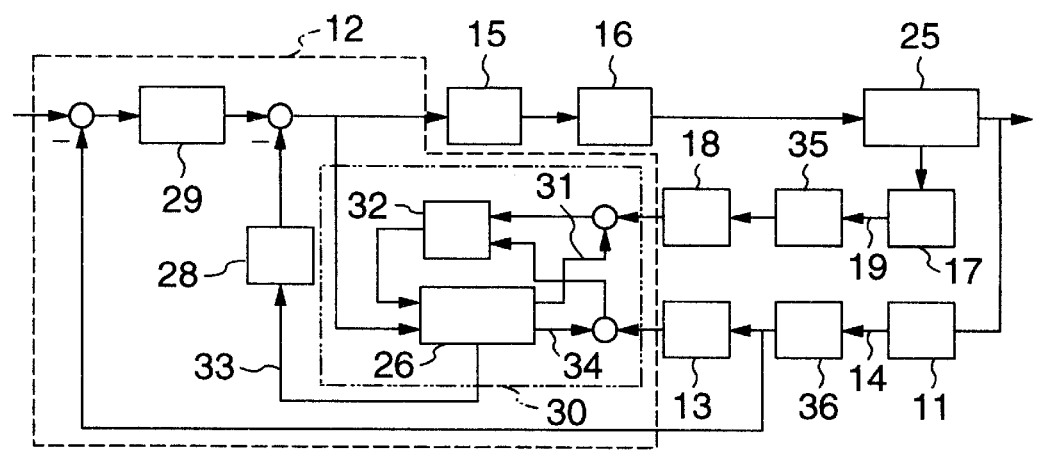
FIG. 6 is a diagram showing the structure of a second embodiment of the invention.

FIG. 6 shows the structure that a signal from the accelerometer in the above embodiment is supplied to the AD converter via a high-pass filter 35 and a servo signal is input to a low-pass filter 36. These filters may be those which can be expressed by the transfer function given in the following equation (4):

$$\frac{\omega^2}{s^2 + 2\zeta\omega s + \omega^2} \qquad (4)$$

where s is a Laplace operator, $\zeta$ is an attenuation factor, and $\omega$ is a specific angular frequency. With this structure, the advantageous effects can be achieved including elimination of a drift of the accelerometer and an alias noise of the servo signal.

Figure 7:
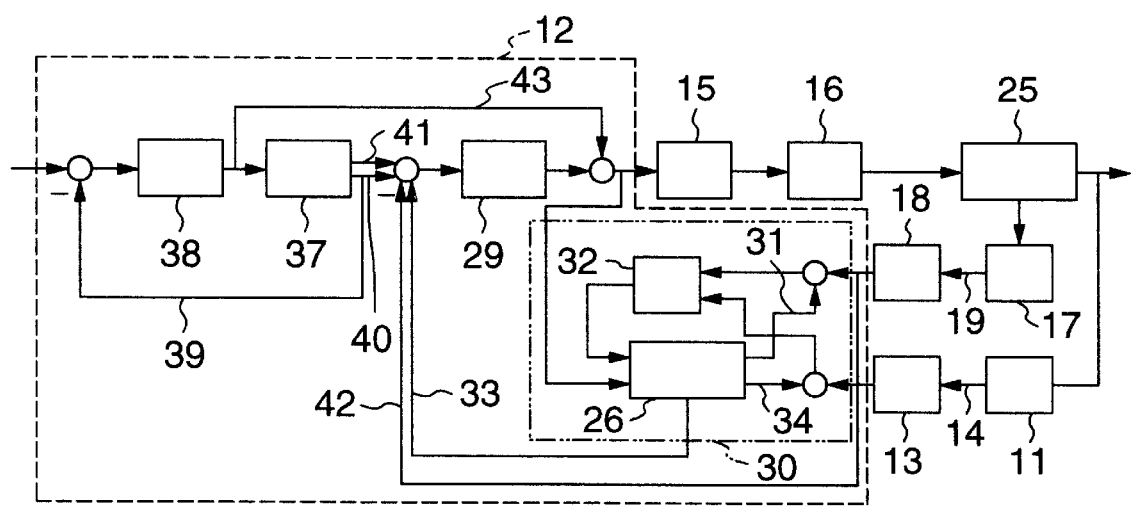
FIG. 7 is a diagram showing the structure of a third embodiment of the invention.

FIG. 7 shows another embodiment of the invention. A microprocessor 12 driven at a sampling period of 50 $\mu$s has a model control system constituted of a control object model 37, a second compensator 38, and a feedback loop 39 for controlling the control object model. A state estimator 30 for estimating the control object is provided which is input with a servo signal 14 detected at every 150 $\mu$s and estimates a servo signal 33 at every 50 $\mu$s. A deviation 40 and an acceleration 41 of the control object model 37 are compared with an estimated servo signal 33 and a signal 42 detected by an accelerometer, respectively, and respective error signals are input to a compensator 29 in the following servo mode. An addition signal of the output of the compensator and an operation quantity 43 for the model control system is output from a DA converter 15 as an actual operation quantity.

This structure will be expressed by equations. The transfer function from a target value R to a value Y is expressed by the following equation (5):

$$Y = \frac{P}{1+PC} U_m + \frac{P}{1+PC} Y_m \qquad (5)$$

$$= \frac{P}{1+PC} \frac{C_m}{1+P_mC_m} R + \frac{PC}{1+PC} \frac{P_mC_m}{1+P_mC_m} R$$

$$= \frac{P(1+CP_m)C_m}{(1+PC)(1+P_mC_m)} R$$

where Cm(s) is a transfer function of the first compensator 38, Pm(s) is the control object model, C(s) is the compensator 29 in the following servo mode, P(s) is a transfer function of a power amplifier 16 and a control object 25, R is a target value, Urn is an operation quantity 43 of the model control system, Ym is the deviation 40 and acceleration 41 of the control object model 37, and Y is the deviation and acceleration 10 of the control object. Assuming that P=Pm+δ, i.e., that there is a difference 5 between an actual control object and the control object model, the above equation (5) is given by the following equation (6):

$$Y = \frac{(P_m+\delta)(1+CP_m)C_m}{(1+(P_m+\delta)C)(1+P_mC_m)} R \qquad (6)$$

If δ=0, then the following equation (7) stands:

$$Y = \frac{P_m(1+CP_m)C_m}{(1+P_mC)(1+P_mC_m)} R \qquad (7)$$

$$= \frac{P_mC_m}{1+P_mC_m} R$$

It can be understood that the operation follows the transfer function of the model control system. The transfer function Cm of the compensator 38 of the model control system is therefore set so that the desired characteristic of the equation (7) is obtained.

If δ is not 0, an error between Ym and Y is given by the following equation (8):

$$Y_m - Y = \frac{P_mC_m}{1+P_mC_m} R - \frac{P(1+CP_m)C_m}{(1+PC)(1+P_mC_m)} R \qquad (8)$$

$$= \frac{(P_m-P)C_m}{(1+PC)(1+P_mC_m)} R$$

$$= \frac{(P_m-P)C_m}{(1+PC)(1+P_mC_m)} R$$

If Pm=P, the error is always 0, whereas if not, an error given by the equation (8) is generated. The characteristic of the compensator 29 (C) of the feedback control system is therefore designed so that the transfer characteristic of the equation (8) becomes small.

In the above manner, the transfer function Cm(s) of the first compensator 38 of the model control system and the transfer function C(s) of the compensator 29 in the following servo mode can be designed. Specifically, the transfer functions may be designed in accordance with known control theories, such as a pole designating method and an H infinite control theory.

This embodiment is applicable not only to the seek servo mode for a normal magnetic disk apparatus servo system, but also to an integral system of the seek servo mode and following servo mode.

As above, in this embodiment, a model control system is provided, and both the magnetic head displacement and carriage acceleration are controlled so as to make them coincident with the outputs of the model, at given target values in the seek and following servo modes. Therefore, vibration of an acceleration of the carriage in particular can be suppressed effectively.

Figure 8:
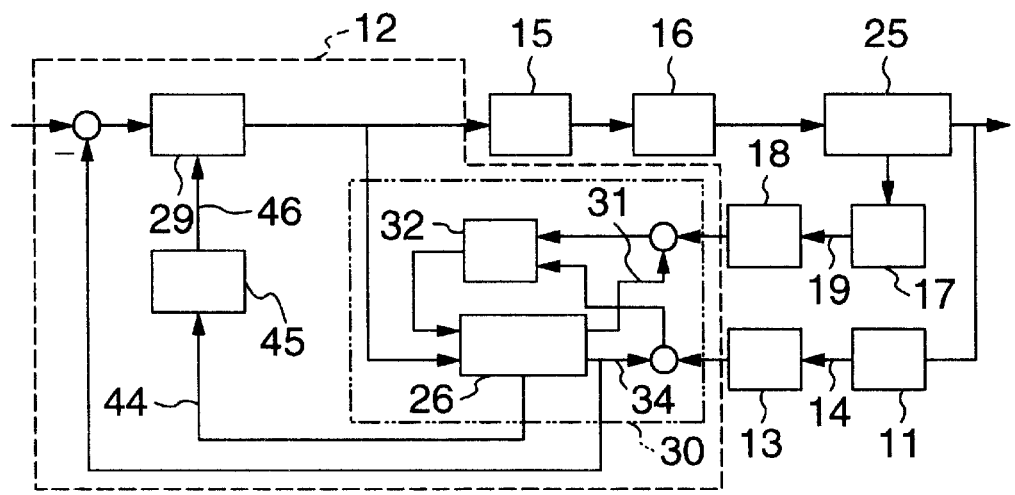
FIG. 8 is a diagram showing the structure of a fourth embodiment of the invention.

FIG. 8 shows a further embodiment of the invention. Means for setting an initial value to an internal variable of a compensator 29 in the following servo mode when the seek servo mode is switched to the following servo mode, is disclosed in a first prior art example Japanese Patent Application No. 2-90329 and in a second prior art example "Initial Value Compensation Design in Mode Switching Control and Application to Magnetic Disk Apparatus" by Yamaguchi, Shishida, Touyama, and Hirai, a collection of papers of the Society of Instrument and Control Engineers, Vol. 31, No. 6, pp. 780/788 (1995). A problem associated with this means resides, as indicated in the second prior art example, in that a desired transient response cannot be obtained if the detection precision of the state quantities, i.e., a deviation and a speed signal, of a control object when the mode is switched, is not sufficient. The speed signal in particular cannot be monitored directly so that an error is likely to occur. With a conventional method, it is obtained from a servo signal or deviation.

In this embodiment, similar to the above embodiments, a state estimator operating at the sampling frequency of 50 μs is used, and input to this state estimator are a signal 19 from an accelerometer at the sampling frequency of 50 μs and a servo signal 14 at the sampling period of 150 μs. The estimated signal from the state estimator is calculated at the sampling period of 50 μs so that a compensator 29 in the following servo mode is calculated in accordance with the estimated signal. A DA converter is operated at the sampling frequency of 50 μs. The state estimator is operated also in the seek servo mode.

When the seek servo mode is switched to the following servo mode, an initial value 46 is obtained from means 45 for multiplying estimated deviation and speed signal 44 obtained at the sampling period of 50 μs by proper coefficients, and input to the internal variable of the compensator 29. Means for calculating the initial value is disclosed in the second prior art example so that the details thereof are omitted. This means can be represented by the following equation (9):

$$Xc(0)=K \cdot Xp(0) \qquad (9)$$

where Xc(0) is an initial value when the mode of the compensator 29 is switched, Xp(0) is a state quantity of the control object 25 when the mode is switched. In this case, the state quantities in concern are a deviation Xp1(0) and a speed Xp2(0). K is a coefficient matrix. The deviation Xp1(0) and speed Xp2(0) are obtained in accordance with the estimated signal 44 from the state estimator 30, and substituted into the right side of the equation (9).

In this embodiment, it is possible to estimate the speed signal used for initial value compensation, with high precision. Furthermore, the following servo mode is calculated at the period shorter than the sampling period of the servo signal. Therefore, a transient response after the mode switching can be improved effectively.

Figure 9:
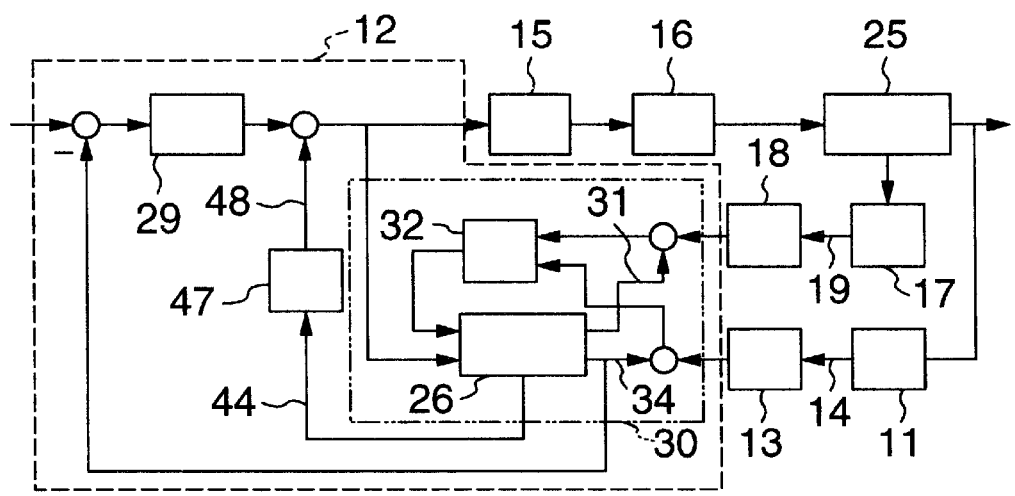
FIG. 9 is a diagram showing the structure of a fifth embodiment of the invention.

FIG. 9 shows an example of the structure added with means for supplying the following servo mode with an additional input when the seek servo mode is switched to the following servo mode. This means for supplying the following servo mode with an additional input when the seek servo mode is switched to the following servo mode, is disclosed in Japanese Patent Application No. 6-276250. Similar to the third embodiment, a problem associated with this means resides in that a desired transient response cannot be obtained if the detection precision of the state quantities, i.e., a deviation and a speed signal, of a control object when the mode is switched, is not sufficient. To avoid this, similar to the third embodiment, a speed signal 44 is estimated by using a state estimator 30. The speed signal and servo signal 14 are input to impulse response calculating means 47 to calculate an impulse response train 48. This response train is added to the servo loop when the mode is switched to the following servo mode to thereby improve a transient response at the switching. Calculation of the impulse response train is disclosed in the above-cited prior art so that the details thereof are omitted. The calculation is given by the following equation (10):

$$r_m = \frac{n_r}{d_r} X_p(0) \tag{10}$$

where rm is the impulse response train, nr/dr is the impulse response calculation means 47, and Xp(0) is a state quantity of the control object 25 when the mode is switched. In this case, the state quantities in concern are a deviation Xp1(0) and a speed Xp2(0). The deviation Xp1(0) and speed Xp2(0) are obtained in accordance with the estimate signal 44 from the state estimator 30, and substituted into the right side of the equation (10).

As above, since the correct state quantity can be estimated, a transient response after the mode switching can be improved effectively.

Figure 10:
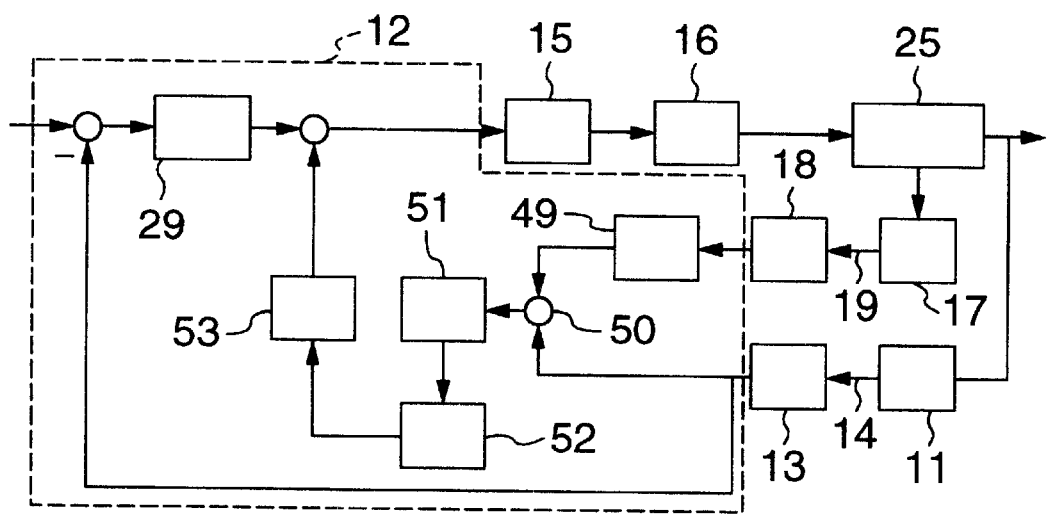
FIG. 10 is a diagram showing the structure of a sixth embodiment of the invention.

FIG. 10 shows an example of the structure which includes: means 49 for calculating a deviation of a magnetic head by a microprocessor through double integral of an AD converted output of an accelerometer; means 50 for calculating a difference between the deviation and a servo signal; means 51 for calculating this difference for several tracks for the whole turn of each track by using a typical magnetic head and tracks; means 52 for averaging the differences; and a memory 53 for storing the average value. The difference represents a variation of magnetic disks. The average represents a revolution sync vibration of a track. Therefore, this revolution sync vibration can be cancelled out if the average value read from the memory 53 is added to the loop of the following servo mode along the circumferential direction of the track during this mode. The revolution sync vibration can be reduced independently from an external disturbance suppressing characteristic of the following servo mode. In this embodiment, since the state of a magnetic head can be measured with an accelerometer 17, a variation of magnetic disks can be separated and the revolution sync vibration can be suppressed effectively. Furthermore, in suppressing the revolution sync vibration, the feedback characteristic of the following servo mode, i.e., external disturbance suppressing characteristic, does not contribute dominantly. Therefore, the feedback characteristic can effectively improve other control characteristics such as a robust stability characteristic.

Figure 11:
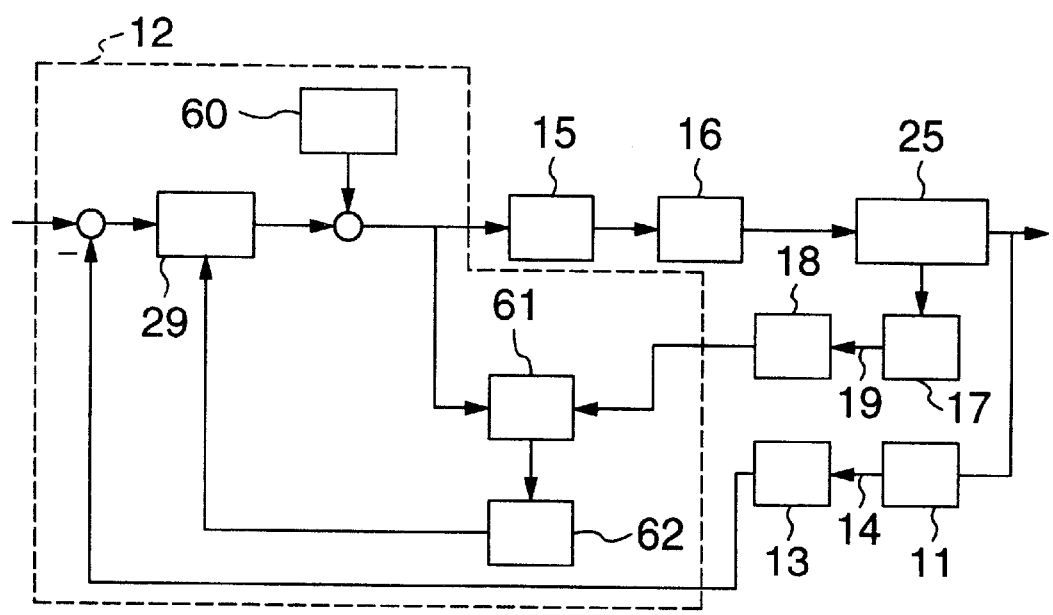
FIG. 11 is a diagram showing the structure of a seventh embodiment of the invention.

FIG. 11 shows another structure having means for measuring the transfer characteristic from a DA converter 15 to an accelerometer 17 in the following servo mode and means for controlling a compensator of the positioning system in accordance with a measured transfer characteristic. The means for measuring the transfer characteristic from the DA converter 15 to the accelerometer 17 includes: means 60 for generating a vibration adding sine wave signal in a microprocessor; means 61 for comparing an amplitude of the vibration adding sine wave signal with an amplitude of a signal from the accelerator; and means 62 for calculating a gain from the DA converter to accelerometer. A method of calculating a gain is disclosed, for example, in "Adaptive Control of Magnetic Disk Apparatus Digital Servo System" by Kobayashi, Yamaguchi, Hirai, Tsuneta, Arai, Onoyam, the Japan Society of Mechanical Engineers, Lecture Meeting of 70-th Normal General Meeting, No. 930–9, 2511, pp. 613/615 (1993). The means for controlling the compensator in the following servo mode changes a gain of a coefficient for the compensator in accordance with a gain from the DA converter to accelerometer, and makes constant a gain from the compensator to accelerator. In this embodiment, since the transfer characteristic from the DA converter to the acceleration of the carriage to be controlled can be measured directly with the accelerometer, a gain of the transfer characteristic can be identified effectively with high precision.

In addition to the above embodiments, the servo control system having an accelerometer juxtaposed with the magnetic head is included in the scope of the present invention.

INDUSTRIAL APPLICABILITY

As described so far, according to the present invention, an accelerometer is mounted on a magnetic head or a support for the magnetic head such as a carriage and an acceleration is detected with the accelerometer. Problems of a conventional control system can be solved and the control performance can be improved effectively, such as reduction of generation of mechanism resonance vibrations of a carriage and improvement on detection precision of a speed signal.

What is claimed is:

1. A magnetic disk apparatus comprising:
   a recording medium on which servo signals are written;
   a head which reads said servo signals;
   a carriage which supports said head;
   a sensor which detects a state of said head or said carriage; and
   a processor comprising:
      an estimator which estimates a quantity about a state of said head or said carriage, by using an output of said sensor and said servo signals at a sampling time of said servo signals, and by using an output of said sensor at a sampling time of said sensor;
      a loop which feeds back said quantity thus estimated of said head or said carriage; and
      a compensator which compares deviation of said head with said servo signals thus detected to compensate error signals to become zero.

2. A magnetic disk apparatus according to claim 1, wherein said processor controls vibration of said head or said carriage based on said quantity.

3. A magnetic disk apparatus according to claim 2, wherein said sensor is an accelerometer, and said processor makes error signals between an output of said accelerometer and said servo signals zero, to make errors between acceleration and deviation of said head or said carriage zero.

4. A magnetic disk apparatus according to claim 1, wherein said sensor is an accelerometer, and said quantity is a resonance mode of said head or said carriage.

5. A magnetic disk apparatus according to claim 4, wherein said processor controls vibrations of said head or said carriage based on said resonance mode.

6. A magnetic disk apparatus according to claim 1, wherein said sensor is an accelerometer, and said processor calculates an output of said accelerometer, and controls acceleration of said head or said carriage.

7. A magnetic disk apparatus according to claim 1, wherein a sampling period of said sensor is shorter than a sampling period of said servo signals.

8. A magnetic disk apparatus according to claim 1, wherein said recording medium is a magnetic disk.

* * * * *